United States Patent
Isono et al.

(10) Patent No.: US 9,156,961 B2
(45) Date of Patent: Oct. 13, 2015

(54) VULCANIZATE AND PROCESS FOR PRODUCING SAME

(71) Applicants: DENKI KAGAKU KOGYO KABUSHIKI KAISHA, Tokyo (JP); National University Corporation Nagaoka University of Technology, Nagaoka-shi, Niigata (JP)

(72) Inventors: Yoshinobu Isono, Nagaoka (JP); Naoki Kobayashi, Itoigawa (JP); Yasushi Abe, Itoigawa (JP)

(73) Assignees: DENKI KAGAKU KOGYO KABUSHIKI KAISHA, Tokyo (JP); NATIONAL UNIVERSITY CORPORATION NAGAOKA UNIVERSITY OF TECHNOLOGY, Nagaoka-Shi (JP)

( * ) Notice: Subject to any disclaimer, the term of this patent is extended or adjusted under 35 U.S.C. 154(b) by 0 days.

(21) Appl. No.: 14/391,667

(22) PCT Filed: Nov. 27, 2012

(86) PCT No.: PCT/JP2012/080559
§ 371 (c)(1),
(2) Date: Oct. 9, 2014

(87) PCT Pub. No.: WO2013/153698
PCT Pub. Date: Oct. 17, 2013

(65) Prior Publication Data
US 2015/0073086 A1    Mar. 12, 2015

(30) Foreign Application Priority Data
Apr. 11, 2012   (JP) ................. 2012-089829

(51) Int. Cl.
C08K 3/04 (2006.01)
B29C 35/02 (2006.01)

(52) U.S. Cl.
CPC . *C08K 3/04* (2013.01); *B29C 35/02* (2013.01); *B29K 2011/00* (2013.01)

(58) Field of Classification Search
USPC .................... 524/552; 526/96, 294
See application file for complete search history.

(56) References Cited

U.S. PATENT DOCUMENTS 6,495,625 B1 * 12/2002 Abe et al. .............. 524/495
2008/0295941 A1  12/2008 Shiraishi ............... 152/517

FOREIGN PATENT DOCUMENTS

| | | |
|---|---|---|
| JP | 5-337971 A | 4/1978 |
| JP | 8-1816 A | 1/1996 |
| JP | 10-34764 A | 2/1998 |
| JP | 2007-145292 A | 6/2007 |
| JP | 2010-265431 A | 11/2010 |
| JP | 2011-38063 A | 2/2011 |
| JP | 2011-126929 A | 6/2011 |
| JP | 2011-148891 A | 8/2011 |

OTHER PUBLICATIONS

Yoshinobu Isono, "Gum Zairyo no Atarashii tano Seigyo", Dai 23 Kai Elastomer Toronkai Koen Yoshishu, The Society of Rubber Industry, Japan, Dec. 1, 2011, pp. 105-106.
International Search Report mailed Feb. 19, 2013, issued to corresponding International Patent Application No. PCT/JP2012/080559.

* cited by examiner

*Primary Examiner* — Robert Harlan
(74) *Attorney, Agent, or Firm* — Stein IP, LLC

(57) ABSTRACT

Provided are a vulcanizate of a chloroprene rubber composition containing carbon black that generates a smaller amount of heat when used and a method for producing the same by a simpler and more convenient method. First, an unvulcanized rubber composition at least containing a chloroprene polymer and carbon black is vulcanization-molded, to give a semivulcanized molded article having a cure characteristic value, as determined by the method specified in JIS K6300-2: 2001, in the range of $t_{10}$ to $t_{80}$. Then, the semivulcanized molded article obtained by semivulcanized film-forming step is additionally vulcanized in the state as it is deformed entirely and the deformation is removed, to give vulcanizate in a desired shape.

15 Claims, 1 Drawing Sheet

VULCANIZATE AND PROCESS FOR PRODUCING SAME

CROSS-REFERENCE TO RELATED APPLICATIONS

This application is a national stage application of International Application No. PCT/JP2012/080559, filed Nov. 27, 2012, which claims the benefit of priority to Japanese Application No. 2012-089829, filed Apr. 11, 2012 in the Japanese Patent Office, the disclosures of which is incorporated herein by reference.

TECHNICAL FIELD

The present invention relates to a vulcanizate of chloroprene rubber composition and a process for producing the same. More specifically, it relates to a vulcanizate for use under dynamic environment and a process for producing the same.

BACKGROUND ART

Vulcanized rubber products for use in dynamic environment such as driving belts and tires are often subjected to repeated deformation during use and then, generate heat by hysteresis loss (deformation friction loss) inherent to viscoelastomers. The heat generation during use is adverse to energy conservation and leads to shortening of the lifetime of the vulcanized rubber product by high-temperature degradation.

Accordingly, a serious problem to overcome for such vulcanized rubber products is to find a way to prevent heat generation when they are used under dynamic environment. Thus, there were proposed various methods for reduction of the heat generation in vulcanized rubber products, mainly from the material point of view (see, for example, Patent Documents 1 to 4).

Vulcanized rubber products are produced by molding an unvulcanized or semivulcanized rubber composition into a particular shape and vulcanizing the molded article. There was also proposed a two-step vulcanization method for preparation of a vulcanizate in a complicated shape (see Patent Document 5). In the method described in Patent Document 5, an intermediate molded article semivulcanized in the processing-needed region and completely vulcanized in the other region is first prepared, and then after the semivulcanized region of the intermediate molded article is deformed into a desired shape, the intermediate molded article is vulcanized additionally in that state, to give a vulcanizate.

The inventors have found that a styrene butadiene rubber containing silica and a particular silane-coupling agent (TESPT), if post-vulcanized in the state under application of shearing strain after prevulcanization, shows an increased tan δ value in the high-frequency region and a reduced tan δ value in the low frequency region and published the finding earlier (see Nonpatent Document 1).

CITATION LIST

Patent Literatures

[Patent Document 1] JP-A No. 2010-265431
[Patent Document 2] JP-A No. 2011-038063
[Patent Document 3] JP-A No. 2011-126929
[Patent Document 4] JP-A No. 2011-148891
[Patent Document 5] JP-A No. H08-1816

Nonpatent Literature

[Nonpatent Document 1] Yoshinobu Isono, "New tan δ for rubber materials", Proceedings of 23rd Seminar on Elastomers, the Society of Rubber Science and Technology Japan, Dec. 1, 2011, pp. 105 to 106

SUMMARY OF INVENTION

Technical Problem

The methods described in Patent Documents 1 to 4, which demand modification of the rubber component into a particular terminal structure or a crosslinked structure and addition of a particular vulcanizing agent or modifier as the third component to the rubber composition, have a problem that the application of the vulcanized rubber products obtained is limited. In addition, in the traditional technologies described in Patent Documents 1 to 4, the efficiency of reducing heat generation may be reduced in the molding step, leading to insufficient reduction of heat generation.

The method described in Patent Document 5 is a method of molding and vulcanizing a resin stepwise to overcome the problem in molding processing for "preparation of a molded article in a three-dimensionally complicated shape using a simple-shaped mold," and thus it is not a method aimed at reducing heat generation in the vulcanizate. The two-stage non-equilibrium vulcanization method described in Nonpatent Document 1 can give a silica-containing styrene butadiene rubber composition generating a smaller amount of heat, but such an effect is not obtained in the rubber composition containing carbon black. Further, rubbers other than styrene butadiene rubbers are not examined in Nonpatent Document 1.

A major object of the present invention is to provide a vulcanizate of a chloroprene rubber composition containing carbon black with lower heat generation and a method of producing the vulcanizate by a simpler and more convenient method.

Solution to Problem

The vulcanizate according to the present invention is a vulcanizate obtained by vulcanization-molding an unvulcanized rubber composition at least containing a chloroprene polymer and carbon black, to give a semivulcanized molded article having a cure characteristic value, as determined by the method specified in JIS K6300-2: 2001, in the range of $t_{10}$ to $t_{80}$, vulcanizing the semivulcanized molded article additionally in the state as it is deformed entirely, and then removing the deformation.

The chloroprene polymers, as used herein, include not only a homopolymers of 2-chloro-1,3-butadiene (hereinafter, referred to simply as chloroprene) but also copolymers of chloroprene and other monomers.

The cure characteristic value ($t_{10}$ to $t_{80}$) is a value indicating the vulcanization degree of the vulcanizate, which is determined from the temperature and the period obtained by analyzing the vulcanization curve determined according to JIS K6300-2: 2001 on an oscillating curemeter. The cure characteristic value varies according to the kind of the rubber material and the blending condition of the rubber composition.

The term "semivulcanized" indicates a state in which the vulcanization degree of a rubber is higher than that in the unvulcanized state but not as high as the vulcanization degree desired for the finished product.

The carbon black contained in the vulcanizate is, for example, a carbon black having a nitrogen adsorption specific surface area ($N_2SA$), as determined according to JIS K6217 Method A, in the range of 30 to 200 $m^2/g$.

Carbon black may be contained in the rubber composition in an amount of 20 to 80 parts by mass with respect to 100 parts by mass of the chloroprene polymer.

Silica may be contained in the rubber composition in an amount of 80 parts by mass or less with respect to 100 parts by mass of the chloroprene polymer and a silane-coupling agent in an amount of 0.5 to 25 parts by mass with respect to 100 parts by mass of the silica.

The vulcanizate according to the present invention may have a cure characteristic value, for example in the range of $t_{50}$ to $t_{90}$, after the semivulcanized molded article is vulcanized additionally in the state under deformation.

The loss tangent (tan δ) value A of the vulcanizate according to the present invention (a value determined by the dynamic modulus of elasticity measurement according to JIS K6394 under the condition of a frequency of 10 Hz and a measurement temperature of 150° C.) is smaller than the loss tangent value B of the vulcanizate having the same vulcanization degree that was obtained by equilibrium vulcanization of the rubber composition in the same composition.

The equilibrium vulcanization is not a method of vulcanizing a semivulcanized molded article, as it is deformed entirely, as in the present invention, but means a common vulcanization method used industrially in which the vulcanization reaction is carried out in the state in which the polymer chain is arranged isotropically.

The deformation may be performed by at least one method selected from compression, expansion, shearing, and torsion.

The vulcanizate according to the present invention can be used, for example, in a driving belt, a conveyor belt, an automobile part, or a tire.

The method of producing a vulcanizate according to the present invention comprises a semivulcanized film-forming step of vulcanization-molding an unvulcanized rubber composition at least containing a chloroprene polymer and carbon black, to give a semivulcanized molded article having a cure characteristic value, as determined by the method specified in JIS K6300-2: 2001, in the range of $t_{10}$ to $t_{80}$, and a deformation vulcanization step of vulcanizing the semivulcanized molded article additionally in the state as it is deformed entirely and obtaining a vulcanizate in desirable shape by removing the deformation.

The carbon black for use in the production method may be a carbon black having a nitrogen adsorption specific surface area ($N_2SA$), as determined according to JIS K6217 Method A, of 30 to 200 $m^2/g$.

The rubber composition may contain the carbon black in an amount of 20 to 80 parts by mass with respect to 100 parts by mass of the chloroprene polymer.

The rubber composition may contain silica in an amount of 80 parts by mass or less with respect to 100 parts by mass of the chloroprene polymer and a silane-coupling agent in an amount of 0.5 to 25 parts by mass with respect to 100 parts by mass of the silica.

The vulcanizate obtained in the deformation vulcanization step may have a cure characteristic value, as determined by the method specified by JIS K6300-2: 2001, in the range of $t_{50}$ to $t_{90}$.

The loss tangent (tan δ) value A of the vulcanizate obtained in the deformation vulcanization step (a value determined by the dynamic modulus of elasticity measurement according to JIS K6394 at a frequency of 10 Hz and a measurement temperature of 150° C.) is smaller than the loss tangent value B of the vulcanizate having the same vulcanization degree that was obtained by equilibrium vulcanization of the rubber composition in the same composition.

The deformation may be performed by at least one method selected from compression, expansion, shearing, and torsion.

Advantageous Effects of Invention

It is possible according to the present invention to reduce heat generation in a vulcanizate of chloroprene rubber composition containing carbon black by a simpler and more convenient method, i.e., by simple process control consisting of vulcanization in the undeformed state and additional vulcanization in the deformed state.

DESCRIPTION OF EMBODIMENTS

Figure 1:
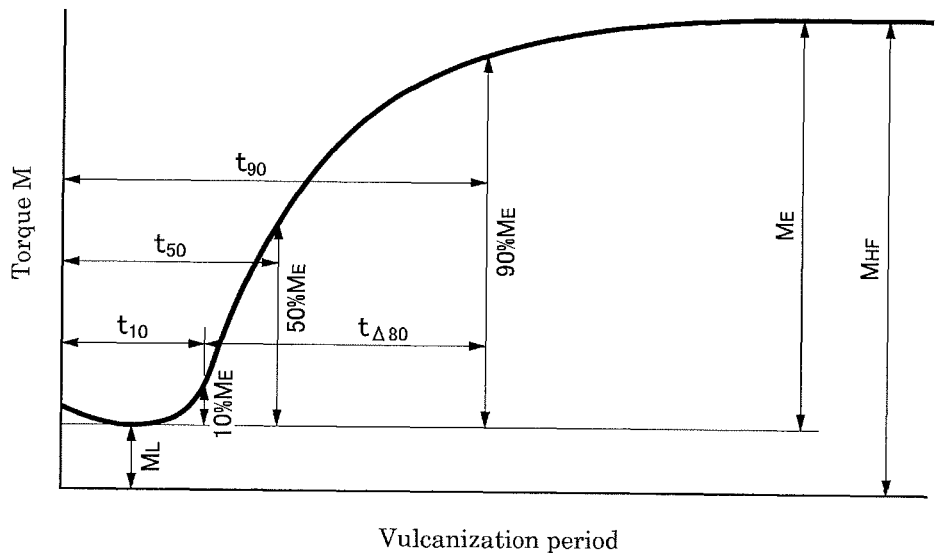
FIG. 1 is a graph showing the change of torque over time, wherein the vulcanization period is plotted on the abscissa and the torque (M) on the ordinate.

Hereinafter, favorable embodiments of the invention will be described in detail.

The vulcanizate in an embodiment of the present invention is prepared by vulcanization-molding an unvulcanized chloroprene rubber composition into a semivulcanized molded article, vulcanizing the semivulcanized molded article additionally in the state where it is deformed entirely, and then removing the deformation. Specifically, the vulcanizate in the present embodiment is produced in a semivulcanized film-forming step of preparing a semivulcanized molded article by vulcanizing an unvulcanized chloroprene rubber composition until it has a cure characteristic value in the range of $t_{10}$ to $t_{80}$ and a deformation vulcanization step of preparing a vulcanizate in a desirable shape by vulcanizing the semivulcanized molded article additionally in the state where it is deformed entirely and then removing the deformation. The vulcanizate is used, for example, in a driving belt, a conveyor belt, an automobile part or a tire.

[Chloroprene Rubber Composition]

The chloroprene rubber composition constituting the vulcanizate in the present embodiment contains at least a chloroprene polymer and carbon black. The chloroprene polymer is a homopolymer of chloroprene or a copolymer of chloroprene and other monomers, which is obtained by emulsion polymerization of chloroprene alone or chloroprene and other monomers.

Chloroprene polymers are grouped into "sulfur-modified" and "non-sulfur-modified" polymers, based on the kind of the molecular weight modifier used during the emulsion polymerization. The sulfur-modified chloroprene polymers are prepared by polymerizing raw monomers in the presence of sulfur, and plasticizing, for example with thiuram disulfide, the polymer containing the molecular weight modifier sulfur in the molecule to a particular viscosity.

Non-sulfur-modified chloroprene polymers include mercaptan-modified polymers, xanthogen-modified polymers, and the like. Mercaptan-modified chloroprene polymers are prepared similarly to the sulfur-modified polymers above, using an alkylmercaptan such as n-dodecylmercaptan, tert-dodecylmercaptan, or octylmercaptan as the molecular weight modifier. Alternatively, xanthogen-modified chloroprene polymers are prepared similarly to the sulfur-modified polymers above, using an alkylxanthogen compound as the molecular weight modifier.

Chloroprene polymers can be grouped, based on the crystallization rate, for example into high-crystallization rate polymers, medium-crystallization rate polymers, and low-crystallization rate polymers. The kind of the chloroprene polymer used in the vulcanizate in the present embodiment is not particularly limited, and any type of the chloroprene polymers above may be used.

Examples of the monomers copolymerizable with chloroprene include acrylic esters such as methyl acrylate, butyl acrylate, and 2-ethylhexyl acrylate; methacrylic esters such as methyl methacrylate, butyl methacrylate, and 2-ethylhexyl methacrylate; hydroxy (meth)acrylates such as 2-hydroxyethyl (meth)acrylate, 2-hydroxymethyl (meth)acrylate, and 2-hydroxypropyl (meth)acrylate; 2,3-dichloro-1,3-butadiene, 1-chloro-1,3-butadiene, butadiene, isoprene, ethylene, styrene, acrylonitrile, and the like.

The monomer to be copolymerized with chloroprene is not limited to be a single monomer and, for example, three or more monomers including chloroprene may be copolymerized. The polymer structure of the chloroprene polymer is also not particularly limited.

The carbon black blended to the chloroprene rubber composition is not particularly limited and examples thereof that can be used include GPF, FEF, HAF, ISAF, SAF and the like. In particular, carbon blacks having a relatively large specific surface area, which were considered to be less effective in dispersion efficiency, are also favorable and it is preferable to use a carbon black having a nitrogen adsorption specific surface area ($N_2SA$) of 30 to 200 $m^2/g$ or more, as determined by JIS K6217 Method A. Use of a carbon black having a $N_2SA$ of lower than 30 $m^2/g$ may result in insufficiently reduction of heat generation. Alternatively, a carbon black having a $N_2SA$ of more than 200 $m^2/g$ may cause dispersion failure and thus, use of such a carbon black may cause product deficiency.

The blending amount of the carbon black is preferably 20 to 80 parts by mass with respect to 100 parts by mass of the chloroprene polymer. When the blending amount of carbon black is less than 20 parts by mass with respect to 100 parts by mass of the chloroprene polymer, it is lower than the percolation threshold value and thus, it may not be possible to obtain the action to reduce heat generation. Alternatively when the blending amount of carbon black is more than 80 parts by mass with respect to 100 parts by mass of the chloroprene polymer, the favorable effect of reducing heat generation obtained by vulcanizing the semivulcanized molded article under deformation may be lost.

The chloroprene rubber composition constituting the vulcanizate of the present embodiment may contain silica and a silane-coupling agent in addition to the chloroprene polymer and carbon black. The silica blended to the rubber composition is not particularly limited, and any one of silica products that are usable as rubber-reinforcing filler such as wet silica, dry silica, and colloidal silica may be used, as it is arbitrarily selected.

Among the various silica products above, in particular, those having a BET specific surface area, as determined according to ISO 5794/1, of 50 $m^2/g$ or more are used favorably, and those having a BET specific surface area of 100 $m^2/g$ or more are used more favorably for improvement of the reinforcing effect and the efficiency of reducing heat generation. Examples of the silica products include "Nipsil®AQ" (BET specific surface area: 190 $m^2/g$) and "Nipsil®VN3" (BET specific surface area: 190 $m^2/g$) produced by Tosoh Silica Corporation, and "Ultrasil VN3" (BET specific surface area: 175 $m^2/g$) produced by Degussa.

The blending amount of silica to the chloroprene rubber composition is preferably 80 parts by mass or less with respect to 100 parts by mass of the chloroprene polymer. When the silica blending amount is more than 80 parts by mass with respect to 100 parts by mass of the chloroprene polymer, the silica may become less dispersible, leading to insufficient reduction of heat generation and further to rapid deterioration of processability.

The blending amount of the silane-coupling agent is preferably 0.5 to 25 parts by mass with respect to 100 parts by mass of silica. The silane-coupling agent reacts with OH groups present on the surface of the inorganic filler such as silica and the conjugated diene-based polymer of the rubber component and forms a reinforcement phase, as it acts as a binding bridge between the inorganic filler and the rubber. Thus, addition of a silane-coupling agent leads to improvement of the reinforcement effect of silica and contributes to reduction of heat generation.

When the blending amount of the silane-coupling agent is less than 0.5 parts by mass with respect to 100 parts by mass of silica, the silane-coupling agent is less reactive with silica, so that it may not be possible to obtain the advantageous effect described above by addition. Alternatively when the silane-coupling agent is blended in an amount of more than 25 parts by mass with respect to 100 parts by mass of silica, addition thereof leads to no favorable effect, only leading to increase in production cost.

Examples of the silane-coupling agents to be blended to the chloroprene rubber composition include sulfide-based silane-coupling agents, mercapto-based silane-coupling agents, amino-based silane-coupling agents, glycide-based silane-coupling agents, and other silane-coupling agents.

Examples of the sulfide-based silane-coupling agents include bis-(3-triethoxysilylpropyl)tetrasulfide, bis-(3-trimethoxysilylpropyl)tetrasulfide, bis-(3-methyldimethoxysilylpropyl)tetrasulfide, bis-(2-triethoxysilylethyl)tetrasulfide, bis-(3-triethoxysilylpropyl)disulfide, his-(3-trimethoxysilylpropyl)disulfide, bis-(3-triethoxysilylpropyl)trisulfide, and the like.

Examples of the mercapto-based silane-coupling agents include 3-hexanoylthiopropyl-triethoxysilane, 3-octanoylthiopropyl-triethoxysilane, 3-decanoylthiopropyl-triethoxysilane, 3-lauroylthiopropyl-triethoxysilane, 2-hexanoylthioethyl-triethoxysilane, 2-octanoylthioethyl-triethoxysilane, 2-decanoylthioethyl-triethoxysilane, 2-lauroylthioethyl-triethoxysilane, 3-hexanoylthiopropyl-trimethoxysilane, 3-octanoylthiopropyl-trimethoxysilane, 3-decanoylthiopropyl-trimethoxysilane, 3-lauroylthiopropyl-trimethoxysilane, 2-hexanoylthioethyl-trimethoxysilane, 2-octanoylthioethyl-trimethoxysilane, 2-decanoylthioethyl-trimethoxysilane, 2-lauroylthioethyl-trimethoxysilane, 3-mercaptopropyl-trimethoxysilane, 3-mercaptopropyl-triethoxysilane, 3-mercaptopropylmethyl-dimethoxysilane, and the like.

Examples of the amino-based silane-coupling agents include 3-aminopropyltrimethoxysilane, 3-aminopropyl-triethoxysilane, and the like.

Examples of the glycide-based silane-coupling agents include γ-glycidoxypropyltrimethoxysilane, γ-glycidoxypropylmethyldiethoxysilane, and the like.

Examples of the other silane-coupling agents include dithiocarbamic acid-based 3-trimethoxysilylpropyl-N,N-dimethylthiocarbamoyltetrasulfide, benzothiazolyl-based 3-trimethoxysilylpropylbenzothiazolyltetrasulfide, and methacrylic acid-based 3-trimethoxysilylpropyl methacryloyl monosulfide.

The silane-coupling agent blended to the chloroprene rubber composition is not limited to the compounds above and any other agent may be used, if it does not inhibit vulcanization or the like. In addition, these silane-coupling agents may be used alone or in combination of two or more.

The chloroprene rubber composition may contain an inorganic filler other than silica in addition to the components above. Examples of the inorganic fillers other than silica include aluminas ($Al_2O_3$) such as γ-alumina and α-alumina; alumina monohydrates ($Al_2O_3$—$H_2O$) such as boehmite and diaspore; aluminum hydroxide [$Al(OH)_3$] such as gibbsite and bayerite; aluminum carbonate [$Al_2(CO_3)_2$], magnesium hydroxide [$Mg(OH)_2$], magnesium oxide (MgO), magnesium carbonate ($MgCO_3$), talc ($3MgO\text{-}4SiO_2$—$H_2O$), attapulgite ($5MgO\text{-}8SiO_2\text{-}9H_2O$), titanium white ($TiO_2$), titanium black ($TiO_{2n-1}$), calcium oxide (CaO), calcium hydroxide [$Ca(OH)_2$], aluminum magnesium oxide (MgO—$Al_2O_3$), clay ($Al_2O_3\text{-}2SiO_2$), kaolin ($Al_2O_3\text{-}2SiO_2\text{-}2H_2O$), pyrophyllite ($Al_2O_3\text{-}4SiO_2$—$H_2O$), bentonite ($Al_2O_3\text{-}4SiO_2\text{-}2H_2O$), aluminum silicates (such as $Al_2SiO_5$ and $Al_4\text{-}3SiO_4\text{-}5H_2O$), magnesium silicates (such as $Mg_2SiO_4$ and $MgSiO_3$), calcium silicates (such as $Ca_2SiO_4$), aluminum calcium silicates (such as $Al_2O_3$—$CaO\text{-}2SiO_2$), magnesium calcium silicate ($CaMgSiO_4$), calcium carbonate ($CaCO_3$), zirconium oxide ($ZrO_2$), zirconium hydroxide [$ZrO(OH)_{2-n}H_2O$], zirconium carbonate [$Zr(CO_3)_2$], and crystalline aluminosilicate salts such as various zeolites containing charge-neutralizing groups such as hydrogens, alkali metals, or alkali-earth metals.

The chloroprene rubber composition may contain, as needed, various chemicals commonly used in the rubber industry such as vulcanization-related compounding agents including vulcanizing agents, vulcanization accelerators, and antiscorching agents, process oils, aging inhibitors, zinc white, and stearic acid in the range that does not impair the advantageous effects of the present invention.

[Semivulcanized Film-Forming Step]

In preparation of the vulcanizate of the present embodiment, the unvulcanized chloroprene rubber composition described above is first vulcanization-molded, to give a semivulcanized molded article having a cure characteristic value in the range of $t_{10}$ to $t_{80}$ (semivulcanized film-forming step). The "cure characteristic value," as used herein, is a value indicating the degree of vulcanization (vulcanization degree) of the vulcanizate, as determined according to the method specified in JIS K6300-2: 2001.

When the vulcanization degree is so small that a semivulcanized molded article having a cure characteristic value of less than $t_{10}$ is obtained in the semivulcanized film-forming step, the semivulcanized molded article changes its shape significantly in the deformation vulcanization step described below, prohibiting preservation of its shape during molding. Alternatively when the vulcanization degree of the semivulcanized molded article is so large that it has a cure characteristic value of more than $t_{80}$, it is not possible to obtain a favorable effect of reducing heat generation even when it is processed in the deformation vulcanization step described below.

The vulcanization condition in the semivulcanized film-forming step (e.g., temperature, period, etc.) is not particularly limited and can be modified properly according to the kinds and blending amounts of the rubber component, the crosslinking agent, and others blended to the rubber composition.

[Deformation Vulcanization Step]

The semivulcanized molded article obtained in the semivulcanized film-forming step above (vulcanization degree: $t_{10}$ to $t_{80}$) is vulcanized additionally in the state as it is deformed entirely and then the deformation applied thereto is removed, to give a vulcanizate in a desirable shape (deformation vulcanization step). As the semivulcanized molded article is vulcanized to a vulcanization degree that permits preservation of the shape, the vulcanizate obtained in the deformation vulcanization step is not significantly different in shape from the semivulcanized molded article, the vulcanizate after deformation vulcanization has a certain permanent deformation, compared with the semivulcanized molded article.

The method for deforming the semivulcanized molded article is not particularly limited, and examples thereof include compression, expansion, shearing, and torsion. When the deformation methods are explained from the definitions of deformation, stress, modulus of elasticity, and viscosity, basic deformation methods are classified into three groups: expansion or compression, shearing, and bulk compression. However when practical vulcanization molding methods are taken into consideration, expansion/compression, shearing, and torsion are considered to be processing methods different from each other. In the method for producing a vulcanizate in the present embodiment, particularly favorable effects are obtained when expansion/compression, shearing, or torsion is used for deformation.

These deformation methods can be used alone or in combination. In addition, the deformation degree of the semivulcanized molded article is also not particularly limited, and can be modified properly according to the kind of the rubber component blended to the rubber composition, the vulcanization degree of the semivulcanized molded article, and the type of deformation.

For example when the deformation is performed by "compression," the deformation rate is preferably 10 to 80%. When the deformation rate is less than 10%, it may not be possible to obtain the favorable effect of reducing heat generation sufficiently, even when the semivulcanized molded article is vulcanized additionally. Alternatively when the deformation rate is more than 80%, an excessively high pressure may be needed for deformation and the semivulcanized molded article may be destructed under pressure, depending on the kind of the rubber component.

In the case of "compression," the deformation rate is more favorably 10 to 50%, and it is possible by regulating the deformation rate in the range above to obtain a vulcanizate that is superior in various physical properties and generates a smaller amount of heat. When the length in the deformation direction of the semivulcanized molded article before deformation is expressed by C and the length in the deformation direction of the semivulcanized molded article after deformation by D, the "deformation rate (%)," as defined above, is calculated according to the following equation: $\{(C-D)/C\} \times 100$. The definition of the lengths C and D remains the same, when the deformation is performed by "expansion," as described below.

When the deformation is performed by "expansion," the deformation rate is preferably 30 to 300%. When the deformation rate is less than 30%, it may not be possible to obtain the favorable effect of reducing heat generation sufficiently even when the semivulcanized molded article is vulcanized additionally. Alternatively when the deformation rate is more than 300%, the semivulcanized molded article may be broken or the vulcanizate obtained may lose its elasticity, depending on the kind of the rubber component.

In the case of "expansion," the deformation rate more preferably in the range of 40 to 200%, and it is possible by regulating the deformation rate in the range above to obtain a vulcanizate that is superior in various physical properties and generates a smaller amount of heat. When the deformation is performed by "expansion," the deformation rate (%) is calculated according to $\{(D-C)/C\}\times100$.

When the deformation is performed by "shearing," the deformation rate is preferably 10 to 200%. When the deformation rate is less than 10%, it may not be possible to obtain the favorable effect of reducing heat generation sufficiently even when the semivulcanized molded article is vulcanized additionally. When the deformation rate is more than 200%, an excessively high shearing force may be needed for deformation and the semivulcanized molded article may be broken, depending on the kind of the rubber component.

In the case of "shearing," the deformation rate is more favorable in the range of 10 to 150%, and it is possible by regulating the deformation rate in the range above to obtain a vulcanizate that is superior in various physical properties and generates a smaller amount of heat. When the deformation is performed by "shearing," the deformation rate (%) is calculated according to $(E/F)\times100$, wherein E represents the shear length and F represents the distance between the shear plate faces.

When the deformation is performed by "torsion," the maximum deformation rate is preferably 30 to 300%. When the deformation rate is less than 30%, it may not be possible to obtain the favorable effect of reducing heat generation sufficiently even when the semivulcanized molded article is vulcanized additionally. Alternatively when it is more than 300%, an excessively large torque may be needed and the vulcanizate may be broken by screwing, depending on the kind of the rubber component.

In the case of "torsion," the deformation rate is more favorable in the range of 50 to 200% and it is possible by regulating the deformation rate in the range above to obtain a vulcanizate that is superior in various physical properties and generates a smaller amount of heat. When the deformation is performed by "torsion," the maximum deformation rate (%) is calculated according to $(R\theta/H)\times100$, wherein R represents the radius of gyration, $\theta$ represents the torsion angle (radian), and H represents the height of the sample.

The vulcanization condition in the deformation vulcanization step (temperature, period, etc.) is not particularly limited and can be modified properly according to the kinds and the blending amounts of the chloroprene polymer and the crosslinking agent blended to the chloroprene rubber composition. The vulcanization degree of the vulcanizate obtained in the deformation vulcanization step is desirably in the range that gives a vulcanizate having a cure characteristic value in the range of $t_{50}$ to $t_{90}$, from the viewpoint of practical performance of the product.

The vulcanizate obtained in the deformation vulcanization step has a loss tangent (tan $\delta$) value A at a frequency of 10 Hz and a measurement temperature of 150° C., as determined by the dynamic modulus of elasticity measurement according to JIS K6394, smaller than the loss tangent value B of the rubber composition in the same composition having the same vulcanization degree, which is prepared by equilibrium vulcanization. The fact indicates that the vulcanizate in the present embodiment generates a smaller amount of heat than the vulcanizates prepared by conventional methods.

As described above in detail, because the vulcanizate in the present embodiment is prepared by vulcanizing a semivulcanized molded article having a particular vulcanization degree obtained by vulcanization molding additionally in the deformed state and then the removing the deformation, the carbon black contained in the chloroprene rubber composition is dispersed more effectively, developing a molecular network structure containing the carbon black. Thus, the vulcanizate has a smaller tan $\delta$ value particularly in the low-frequency region. The vulcanizate generates a smaller amount of heat and it is possible in this way to obtain a vulcanizate generating a smaller amount of heat by a simple and convenient method without deterioration in various physical properties demanded for vulcanized rubber products.

Also in the method described in Patent Document 5 above, chloroprene rubbers are vulcanized in two steps. However in the method described in Patent Document 5, molding vulcanization is performed multiple times for preparation of a molding article in a complicated shape. Thus, the method is different in the purpose and the technological concept from the molding method for a vulcanizate in the present embodiment. Especially in the method described in Patent Document 5, an intermediate vulcanizate is vulcanization molded into a desirable shape, as only the unmolded region thereof is deformed and the molded region is undeformed. Thus, the resulting molding does not show a favorable effect of low heat generation similar to that of the vulcanizate in the present embodiment.

As the vulcanizate in the present embodiment is made to generate a smaller amount of heat, not by modification of the material but by modification of the process, it is possible to obtain a vulcanizate that generates a smaller amount of heat without increase in production cost. The method for producing a vulcanizate in the present embodiment is also effective for energy conservation and contributes to elongation of the life time of the vulcanized rubber product.

EXAMPLES

Hereinafter, advantageous effects of the present invention will be described specifically with reference to Examples and Comparative Examples of the present invention. In the present Examples, the vulcanizates of Examples and Comparative Examples were prepared using the carbon black shown in the following Table 1 by the method shown below and the heat generation properties thereof were evaluated, based on the loss tangent (tan $\delta$) values.

TABLE 1

| Kind | Nitrogen absorption specific surface area ($m^2/g$) |
|---|---|
| SAF | 150 |
| ISAF | 125 |
| HAF | 85 |
| FEF | 55 |
| GPF | 30 |

Example 1

Preparation of Unvulcanized Rubber Composition 100 parts by mass of a chloroprene polymer (PS-40A produced by Denki Kagaku Kogyo K.K., sulfur-modified, low crystallization rate), 35 parts by mass of carbon black (SAF), 1 part by mass of stearic acid, 4 parts by mass of magnesium oxide, 1 part by mass of an amine-based aging inhibitor (Nocrac®CD: 4,4-bis($\alpha,\alpha$-dimethylbenzyl)diphenylamine, produced by Ouchi Shinko Chemical Industrial Co., Ltd.), 1.0 part by mass of a thiourea-based vulcanization accelerator (Accel®22S: ethylene thiourea, produced by Kawaguchi Chemical Industry Co., Ltd.), 0.5 parts by mass of a sulfenamide-based vulcanization accelerator (Nocceler®CZ: N-cyclohexyl-2-benzothiazolylsulfenamide, produced by Ouchi Shinko Chemical Industrial Co., Ltd.), and 5.0 parts by mass of zinc oxide were blended and the mixture was kneaded with an 8-inch roll.

(Evaluation of Vulcanization Degree and Unvulcanized Rubber Composition)

The cure characteristic value of the unvulcanized rubber composition was performed according to JIS K6300-2: 2001, "Determination of cure characteristics with oscillating curemeters." Various properties of a vulcanizate are generally determined as a function of temperature. The cure characteristic value is determined on a vulcanization tester such as disk vulcanization tester (rotor vulcanization tester) or die vulcanization tester (rotorless vulcanization tester). Stress or distortion is applied to the sample repeatedly therein and the resulting distortion or stress is measured.

The vulcanization test is performed at a constant temperature and the rigidity of the test sample (expressed as torque or shearing force) is recorded continuously as a function of time. FIG. 1 is a graph showing the change of torque over time, wherein the torque (M) is plotted on the ordinate and the vulcanization period on the abscissa. When the minimum torque in the vulcanization curve shown in FIG. 1 is designated by $M_L$ and the maximum value by $M_{HF}$, two straight lines passing $M_L$ and $M_{HF}$ are drawn in parallel with the time axis and the distance between these straight lines is determined as $M_E$ ($M_E = M_{HF} - M_L$). For example, straight lines passing $M_L + 10\% \, M_E$, $M_L + 50\% \, M_E$, $M_L + 90\% \, M_E$ respectively in parallel with the time axis are drawn and the intersections thereof with the vulcanization curve determined, and the periods between the test start point and the intersections (vulcanization periods) are determined respectively as $t_{10}$, $t_{50}$, and $t_{90}$.

The cure characteristics of the unvulcanized rubber composition were determined according to JIS K3200-2: 2001, using a rotorless rheometer: RLR-3 produced by Toyo Seiki Seisaku-sho Ltd. at 170° C. for 30 minutes, showing $t_{50}$=1.5 minutes and $t_{60}$=5.0 minutes.

(Semivulcanized Film-Forming Step)

An unvulcanized rubber composition was vulcanization-molded using a mold having a sheet thickness of 2 mm, as it was pressed at 170° C. for 1.5 minutes, to give a sheet-shaped semivulcanized molded article.

(Deformation Vulcanization Step)

The semivulcanized molded article was placed in a mold having a sheet thickness of 1.5 mm and pressed and vulcanization-molded additionally under the condition of a compression deformation rate of 25% at 170° C. for 3.5 minutes ($t_{90}-t_{50}$=3.5 minutes), to give a chloroprene rubber vulcanizate of Example 1.

(Dynamic Viscoelasticity Test: Tan δ)

The loss tangent (tan δ) value of the vulcanizate of Example 1 prepared by the method described above was determined. Specifically, the complex modulus of elasticity E*, as defined by the following Formula 1, was determined in a dynamic viscoelasticity test (JIS K 6394). The real number component E' of the complex modulus of elasticity E* shown in the following Formula 1 is the storage modulus of elasticity, while the imaginary number component E" thereof is loss modulus of elasticity. The phase angle δ, which shows the time lag of deformation and stress, is called loss angle and the loss tangent tan δ, which is the tangent of loss angle, is defined by the following Formula 2:

$$E^* = E' + iE''$$ [Formula 1]

$$\tan \delta = E''/E'$$ [Formula 2]

The tan δ shown in Formula 2 above is an attenuation coefficient, which is expressed by the ratio of the energy released as heat to the energy stored. The value of tan δ shows whether the mechanical energy applied to the rubber material product is "likely to be released as heat" or "hardly stored" and, when the value is low, the sample is considered to generate a smaller amount of heat.

Specifically, the test was performed according to JIS K6394 under the following condition:
Analyzer: Rheovibron automatic dynamic viscoelasticity analyzer
Vibration method: displacement amplitude: 10 μm (deformation: 0.05%), static tension: 5 gf
Sample shape: plate in the dimension of width: 0.45 cm, length: 3 cm (chuck distance: 2 cm), and thickness: 0.2 cm
Measurement frequency: 10 Hz
Measurement temperature condition: 0° C. to 200° C. (heating rate: 5° C./min)

The tan δ value used as the indicator of heat generation was a value at 150° C. As a result, the chloroprene rubber vulcanizate of Example 1 had a tan δ value of 0.052.

Examples 2 to 14

The vulcanizates of Examples 2 to 14 were prepared by a method similar to Example 1 under the composition, vulcanization degree, and deformation rate conditions shown in the following Tables 2 and 3 and the tan δ values thereof were determined. The chloroprene polymer used in Example 10 was M-40 (mercaptan-modified, medium crystallization rate) produced by Denki Kagaku Kogyo K.K. Alternatively in Example 11, silica (Nipsil®VN3, produced by Tosoh Silica Corporation) was added together with carbon black.

Example 15

The vulcanizate of Example 15 was prepared by a method similar to Example 1 under the composition, vulcanization degree, and deformation rate conditions shown in the following Table 3, except that the deformation during vulcanization deformation was performed by "expansion." The semivulcanized molded article having a sheet thickness of 2 mm after vulcanization molding was then vulcanized additionally, as it was held at both ends by chucks and extended in the grain direction by 40% in a hot environment at 170° C.

Example 16

The vulcanizate of Example 16 was prepared by a method similar to Example 1 under the composition, vulcanization degree, and deformation rate conditions shown in the following Table 3, except that the deformation during vulcanization deformation was performed by "shearing." The semivulcanized molded article having a sheet thickness of 2 mm after vulcanization molding was then vulcanized additionally, as it was held at both ends by chucks and sheared by 40%, while the central chuck was displaced in the grain direction in a hot environment at 170° C.

Comparative Examples 1 to 11

Equilibrium Vulcanization Step

The unvulcanized rubber compositions prepared in the composition shown in the following Tables 4 and 5 were cured under pressure in a mold having a sheet thickness of 2 mm by a method similar to Example 1 at 170° C. for 5 minutes, to give respectively the vulcanizates of Comparative Examples 1 to 11 having the vulcanization degree shown in the following Tables 4 and 5 and the tan δ values thereof were determined. The results are summarized in the following Tables 2 to 5.

TABLE 2

| | | | Example | | | |
|---|---|---|---|---|---|---|
| | | | 1 | 2 | 3 | 4 |
| Composition | Chloroprene polymer | PS-40A | 100 | 100 | 100 | 100 |
| | | M-40 | | | | |
| | Filler | Carbon black SAF | 35 | | | |
| | | Carbonblack ISAF | | 35 | | |
| | | Carbonblack HAF | | | 35 | |
| | | Carbon black FEF | | | | 35 |
| | | Carbon black GPF | | | | |
| | | Silica VN3 | | | | |
| | Silane-coupling agent | Bis(triethoxysilylpropyl)tetrasulfide | | | | |
| | Lubricant-processing aid | Stearic acid | 1 | 1 | 1 | 1 |
| | Acid acceptor | Magnesium oxide | 4 | 4 | 4 | 4 |
| | Aging inhibitor | Amine-based aging inhibitor | 1 | 1 | 1 | 1 |
| | Vulcanization accelerator | Thiourea-based vulcanization accelerator | 1 | 1 | 1 | 1 |
| | | Sulfenamide-based vulcanization accelerator | 0.5 | 0.5 | 0.5 | 0.5 |
| | | Zinc oxide | 5 | 5 | 5 | 5 |
| Vulcanization step | Semivulcanization step | Vulcanization degree $t_{x1}$ | 50 | 50 | 50 | 50 |
| | Deformation step | Deformation rate [%] | 25 | 25 | 25 | 25 |
| | | Type of deformation | Compression | Compression | Compression | Compression |
| | Additional deformation-vulcanization step | Vulcanization degree $t_{x2}$ | 40 | 40 | 40 | 40 |
| | Total vulcanization degree | $t_{x1} + t_{x2}$ | 90 | 90 | 90 | 90 |
| Evaluation | | tan δ (at 10 Hz, 150° C.) | 0.052 | 0.053 | 0.05 | 0.048 |
| | | tan δ ratio (A)/(B) | 0.87 | 0.96 | 0.98 | 0.98 |

| | | | Example | | | |
|---|---|---|---|---|---|---|
| | | | 5 | 6 | 7 | 8 |
| Composition | Chloroprene polymer | PS-40A | 100 | 100 | 100 | 100 |
| | | M-40 | | | | |
| | Filler | Carbon black SAF | | 45 | | |
| | | Carbonblack ISAF | | | 45 | 55 |
| | | Carbonblack HAF | | | | |
| | | Carbon black FEF | | | | |
| | | Carbon black GPF | 30 | | | |
| | | Silica VN3 | | | | |
| | Silane-coupling agent | Bis(triethoxysilylpropyl)tetrasulfide | | | | |
| | Lubricant-processing aid | Stearic acid | 1 | 1 | 1 | 1 |
| | Acid acceptor | Magnesium oxide | 4 | 4 | 4 | 4 |
| | Aging inhibitor | Amine-based aging inhibitor | 1 | 1 | 1 | 1 |
| | Vulcanization accelerator | Thiourea-based vulcanization accelerator | 1 | 1 | 1 | 1 |
| | | Sulfenamide-based vulcanization accelerator | 0.5 | 0.5 | 0.5 | 0.5 |
| | | Zinc oxide | 5 | 5 | 5 | 5 |
| Vulcanization step | Semivulcanization step | Vulcanization degree $t_{x1}$ | 50 | 50 | 50 | 50 |
| | Deformation step | Deformation rate [%] | 25 | 25 | 25 | 25 |
| | | Type of deformation | Compression | Compression | Compression | Compression |
| | Additional deformation-vulcanization step | Vulcanization degree $t_{x2}$ | 40 | 40 | 40 | 40 |
| | Total vulcanization degree | $t_{x1} + t_{x2}$ | 90 | 90 | 90 | 90 |
| Evaluation | | tan δ (at 10 Hz, 150° C.) | 0.055 | 0.058 | 0.056 | 0.055 |
| | | tan δ ratio (A)/(B) | 0.99 | 0.83 | 0.86 | 0.82 |

TABLE 3

| | | | Example | | | |
|---|---|---|---|---|---|---|
| | | | 9 | 10 | 11 | 12 |
| Composition | Chloroprene polymer | PS-40A | 100 | | 100 | 100 |
| | | M-40 | | 100 | | |
| | Filler | Carbon black SAF | | | | 35 |
| | | Carbon black ISAF | | | 30 | |
| | | Carbon black HAF | 45 | 35 | | |

TABLE 3-continued

|  |  |  |  |  |  |  |
|---|---|---|---|---|---|---|
|  |  | Carbon black FEF |  |  |  |  |
|  |  | Carbon black GPF |  |  |  |  |
|  |  | Silica VN3 |  |  |  | 15 |
|  | Silane-coupling agent | Bis(triethoxysilylpropyl)tetrasulfide |  |  |  | 3.6 |
|  | Lubricant-processing aid | Stearic acid | 1 | 1 | 1 | 1 |
|  | Acid acceptor | Magnesium oxide | 4 | 4 | 4 | 4 |
|  | Aging inhibitor | Amine-based aging inhibitor | 1 | 1 | 1 | 1 |
|  | Vulcanization accelerator | Thiourea-based vulcanization accelerator | 1 | 1 | 1 | 1 |
|  |  | Sulfenamide-based vulcanization accelerator | 0.5 | 0.5 | 0.5 | 0.5 |
|  |  | Zinc oxide | 5 | 5 | 5 | 5 |
| Vulcanization step | Semivulcanization step | Vulcanization degree $t_{x1}$ | 50 | 50 | 50 | 30 |
|  | Deformation step | Deformation rate [%] | 25 | 25 | 25 | 25 |
|  |  | Type of deformation | Compression | Compression | Compression | Compression |
|  | Additional deformation-vulcanization step | Vulcanization degree $t_{x2}$ | 40 | 40 | 40 | 40 |
|  | Total vulcanization degree | $t_{x1} + t_{x2}$ | 90 | 90 | 90 | 70 |
| Evaluation |  | tanδ (at 10 Hz, 150° C.) | 0.050 | 0.056 | 0.049 | 0.057 |
|  |  | tanδ ratio (A)/(B) | 0.91 | 0.93 | 0.80 | 0.91 |

|  |  |  | Example |  |  |  |
|---|---|---|---|---|---|---|
|  |  |  | 13 | 14 | 15 | 16 |
| Composition | Chloroprene polymer | PS-40A | 100 | 100 | 100 | 100 |
|  |  | M-40 |  |  |  |  |
|  | Filler | Carbon black SAF | 35 | 35 | 35 | 35 |
|  |  | Carbon black ISAF |  |  |  |  |
|  |  | Carbon black HAF |  |  |  |  |
|  |  | Carbon black FEF |  |  |  |  |
|  |  | Carbon black GPF |  |  |  |  |
|  |  | Silica VN3 |  |  |  |  |
|  | Silane-coupling agent | Bis(triethoxysilylpropyl)tetrasulfide |  |  |  |  |
|  | Lubricant-processing aid | Stearic acid | 1 | 1 | 1 | 1 |
|  | Acid acceptor | Magnesium oxide | 4 | 4 | 4 | 4 |
|  | Aging inhibitor | Amine-based aging inhibitor | 1 | 1 | 1 | 1 |
|  | Vulcanization accelerator | Thiourea-based vulcanization accelerator | 1 | 1 | 1 | 1 |
|  |  | Sulfenamide-based vulcanization accelerator | 0.5 | 0.5 | 0.5 | 0.5 |
|  |  | Zinc oxide | 5 | 5 | 5 | 5 |
| Vulcanization step | Semivulcanization step | Vulcanization degree $t_{x1}$ | 50 | 50 | 50 | 50 |
|  | Deformation step | Deformation rate [%] | 25 | 40 | 40 | 40 |
|  |  | Type of deformation | Compression | Compression | Expansion | Shearing |
|  | Additional deformation-vulcanization step | Vulcanization degree $t_{x2}$ | 20 | 40 | 40 | 40 |
|  | Total vulcanization degree | $t_{x1} + t_{x2}$ | 70 | 90 | 90 | 90 |
| Evaluation |  | tanδ (at 10 Hz, 150° C.) | 0.056 | 0.050 | 0.053 | 0.050 |
|  |  | tanδ ratio (A)/(B) | 0.90 | 0.85 | 0.96 | 0.86 |

TABLE 4

|  |  |  | Comparative Example |  |  |  |  |  |
|---|---|---|---|---|---|---|---|---|
|  |  |  | 1 | 2 | 3 | 4 | 5 | 6 |
| Composition | Chloroprene polymer | PS-40A | 100 | 100 | 100 | 100 | 100 | 100 |
|  |  | M-40 |  |  |  |  |  |  |
|  | Filler | Carbon black SAF | 35 |  |  |  |  | 45 |
|  |  | Carbon black ISAF |  | 35 |  |  |  |  |
|  |  | Carbon black HAF |  |  | 35 |  |  |  |
|  |  | Carbon black FEF |  |  |  | 35 |  |  |
|  |  | Carbon black GPF |  |  |  |  | 30 |  |
|  |  | Silica VN3 |  |  |  |  |  |  |
|  | Silane-coupling agent | Bis(triethoxysilylpropyl)tetrasulfide |  |  |  |  |  |  |
|  | Lubricant-processing aid | Stearic acid | 1 | 1 | 1 | 1 | 1 | 1 |
|  | Acid acceptor | Magnesium oxide | 4 | 4 | 4 | 4 | 4 | 4 |
|  | Aging inhibitor | Amine-based aging inhibitor | 1 | 1 | 1 | 1 | 1 | 1 |
|  | Vulcanization accelerator | Thiourea-based vulcanization accelerator | 1 | 1 | 1 | 1 | 1 | 1 |
|  |  | Sulfenamide-based vulcanization accelerator | 0.5 | 0.5 | 0.5 | 0.5 | 0.5 | 0.5 |
|  |  | Zinc oxide | 5 | 5 | 5 | 5 | 5 | 5 |
| Evaluation |  | tanδ (at 10 Hz, 150° C.) | 0.060 | 0.055 | 0.051 | 0.050 | 0.056 | 0.070 |

TABLE 5

|  |  |  | Comparative Example | | | | |
|---|---|---|---|---|---|---|---|
|  |  |  | 7 | 8 | 9 | 10 | 11 |
| Composition | Chloroprene polymer | PS-40A | 100 | 100 | 100 |  | 100 |
|  |  | M-40 |  |  |  | 100 |  |
|  | Filler | Carbon black SAF |  |  |  |  |  |
|  |  | Carbon black ISAF | 45 | 55 |  |  | 30 |
|  |  | Carbon black HAF |  |  | 45 | 35 |  |
|  |  | Carbon black FEF |  |  |  |  |  |
|  |  | Carbon black GPF |  |  |  |  |  |
|  |  | Silica VN3 |  |  |  |  | 15 |
|  | Silane-coupling agent | Bis(triethoxysilylpropyl)tetrasulfide |  |  |  |  | 3.6 |
|  | Lubricant-processing aid | Stearic acid | 1 | 1 | 1 | 1 | 1 |
|  | Acid acceptor | Magnesium oxide | 4 | 4 | 4 | 4 | 4 |
|  | Aging inhibitor | Amine-based aging inhibitor | 1 | 1 | 1 | 1 | 1 |
|  | Vulcanization accelerator | Thiourea-based vulcanization accelerator | 1 | 1 | 1 | 1 | 1 |
|  |  | Sulfenamide-based vulcanization accelerator | 0.5 | 0.5 | 0.5 | 0.5 | 0.5 |
|  |  | Zinc oxide | 5 | 5 | 5 | 5 | 5 |
| Evaluation |  | tanδ (at 10 Hz, 150° C.) | 0.065 | 0.067 | 0.055 | 0.060 | 0.061 |

As shown in Tables 2 to 5 above, the vulcanizates of Examples 1 to 16, which were prepared within the scope of the present invention, had a loss tangent (tan δ) value (A), as determined in the dynamic modulus of elasticity measurement according to JIS K6394 at a frequency of 10 Hz and a measurement temperature of 150° C., smaller than the loss tangent value (B) of a vulcanizate having the same vulcanization degree that was obtained by equilibrium vulcanization of the rubber composition in the same composition.

For example, tan δ of the vulcanizate of Example 1 (=0.052) was smaller than tan δ of the vulcanizate of Comparative Example 1 (=0.060). When the vulcanizate of Example 1 and the vulcanizate of Comparative Example 1 are compared, the ratio (A/B) is 0.87, which is smaller than 1. As described above, a smaller value (A/B) indicates that the favorable effect of reducing heat generation is stronger.

Figure 2:
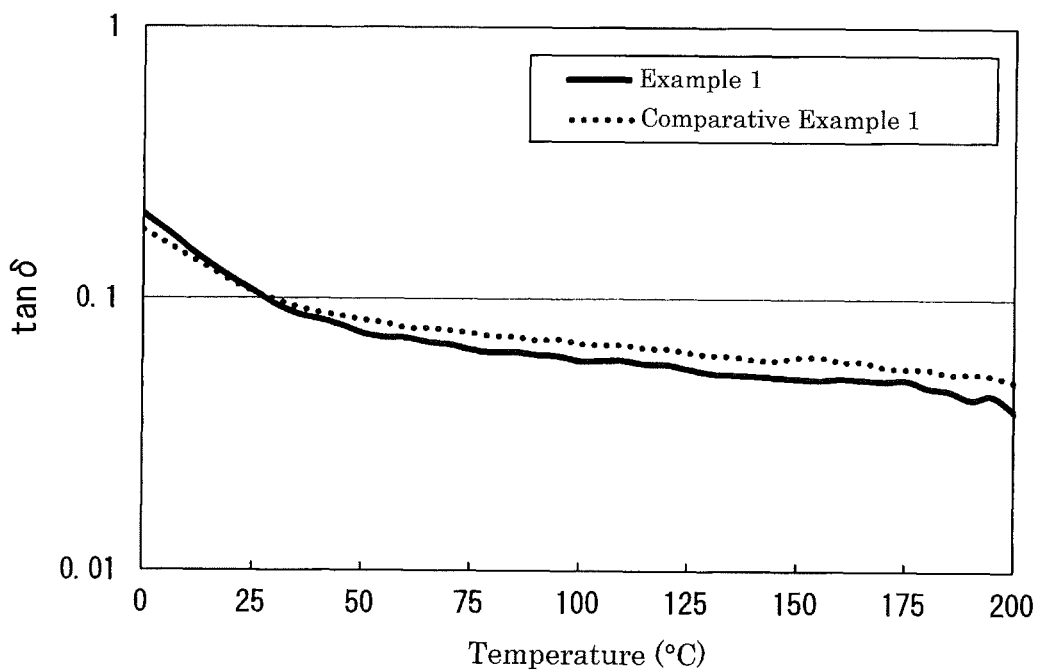
FIG. 2 is a graph comparing the temperature dependences of tan δ of the vulcanizates of Example 1 and Comparative Example 1, wherein the tan δ is plotted on the ordinate and the temperature on the abscissa.

FIG. 2 is a graph comparing the temperature dependences of tan δ of the vulcanizates of Example 1 and Comparative Example 1, in which tan δ is plotted on the ordinate and the temperature on the abscissa. As indicated in FIG. 2, the vulcanizate of Example 1 shows the favorable effect of reducing heat generation in an environment at approximately 30° C. or higher and the effect is magnified at higher temperature.

Although not shown in the Table, a driving belt was prepared using an unvulcanized rubber composition in the composition similar to that in each Example described above in the semivulcanized film-forming step and the deformation vulcanization step under a condition similar to that of each Example. The driving belt obtained generated a smaller amount of heat during use and had a longer product life.

Although not shown in the Table, a conveyor belt was prepared, using an unvulcanized rubber composition in the composition similar to that in each Example described above in the semivulcanized film-forming step and the deformation vulcanization step under a condition similar to that of each Example. The conveyor belt obtained generated a smaller amount of heat during use and had a longer product life.

The results above confirm that it is possible according to the present invention to make a vulcanizate of a chloroprene rubber composition containing carbon black generate a smaller amount of heat by a simpler and more convenient method.

The invention claimed is:

1. A vulcanizate, obtained by vulcanization-molding an unvulcanized rubber composition at least containing a chloroprene polymer and carbon black, to give a semivulcanized molded article having a cure characteristic value, as determined by the method specified in JIS K6300-2: 2001, in the range of $t_{10}$ to $t_{80}$, vulcanizing the semivulcanized molded article additionally in the state as it is deformed entirely, and then removing the deformation.

2. The vulcanizate according to claim 1, wherein the carbon black has a nitrogen adsorption specific surface area ($N_2SA$), as determined by JIS K6217 Method A, of 30 to 200 $m^2/g$.

3. The vulcanizate according to claim 1, wherein the rubber composition contains the carbon black in an amount of 20 to 80 parts by mass with respect to 100 parts by mass of the chloroprene polymer.

4. The vulcanizate according to claim 1, wherein the rubber composition contains additionally silica in an amount of 80 parts by mass or less with respect to 100 parts by mass of the chloroprene polymer and a silane-coupling agent in an amount of 0.5 to 25 parts by mass with respect to 100 parts by mass of silica.

5. The vulcanizate according to claim 1, wherein the cure characteristic value after the additional vulcanization in the deformed state is in the range of $t_{50}$ to $t_{90}$.

6. The vulcanizate according to claim 1, wherein the loss tangent (tan δ) value A of the vulcanizate, as determined by the dynamic modulus of elasticity measurement according to JIS K6394 at a frequency of 10 Hz and a measurement temperature of 150° C., is smaller than the loss tangent value B of the vulcanizate having the same vulcanization degree that was obtained by equilibrium vulcanization of the rubber composition in the same composition.

7. The vulcanizate according to claim 1, wherein the deformation is performed by at least one method selected from compression, expansion, shearing, and torsion.

8. The vulcanizate according to claim 1, wherein the vulcanizate is used in a driving belt, a conveyor belt, an automobile part, or a tire.

9. A method of producing a vulcanizate, comprising a semivulcanized film-forming step of vulcanization-molding an unvulcanized rubber composition at least containing a chloroprene polymer and carbon black, to give a semivulcanized molded article having a cure characteristic value, as determined by the method specified in JIS K6300-2: 2001, in the range of $t_{10}$ to $t_{80}$, and a deformation vulcanization step of vulcanizing the semivulcanized molded article additionally in the state as it is deformed entirely, and obtaining a vulcanizate in a desirable shape by removing the deformation.

10. The method of producing a vulcanizate according to claim 9, wherein the carbon black has a nitrogen adsorption specific surface area ($N_2SA$), as determined by JIS K6217 Method A, of 30 to 200 $m^2/g$.

11. The method of producing a vulcanizate according to claim 9, wherein the rubber composition contains the carbon black in an amount of 20 to 80 parts by mass with respect to 100 parts by mass of the chloroprene polymer.

12. The method of producing a vulcanizate according to claim 9, wherein the rubber composition contains additionally silica in an amount of 80 parts by mass or less with respect to 100 parts by mass of the chloroprene polymer and a silane-coupling agent in an amount of 0.5 to 25 parts by mass with respect to 100 parts by mass of silica.

13. The method of producing a vulcanizate according to claim 9, wherein the vulcanizate obtained in the deformation vulcanization step has a cure characteristic value, as determined according to the method specified in JIS K6300-2: 2001, in the range of $t_{50}$ to $t_{90}$.

14. The method of producing a vulcanizate according to claim 9, wherein the loss tangent (tan δ) value A of the vulcanizate obtained in the deformation vulcanization step, as determined by the dynamic modulus of elasticity measurement according to JIS K6394 at a frequency of 10 Hz and a measurement temperature of 150° C., is smaller than the loss tangent value B of the vulcanizate having the same vulcanization degree that was obtained by equilibrium vulcanization of the rubber composition in the same composition.

15. The method of producing a vulcanizate according to claim 9, wherein the deformation is performed by at least one method selected from compression, expansion, shearing, and torsion.

\* \* \* \* \*